United States Patent
Linson et al.

(10) Patent No.: US 9,676,345 B2
(45) Date of Patent: Jun. 13, 2017

(54) HEADLINER ASSEMBLY FOR A MOTOR VEHICLE

(71) Applicant: FORD GLOBAL TECHNOLOGIES, LLC, Dearborn, MI (US)

(72) Inventors: Phil Joseph Linson, Commerce Township, MI (US); David Huelke, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 14/472,736

(22) Filed: Aug. 29, 2014

(65) Prior Publication Data

US 2016/0059796 A1   Mar. 3, 2016

(51) Int. Cl.
*B60R 13/02* (2006.01)

(52) U.S. Cl.
CPC ...... *B60R 13/0206* (2013.01); *B60R 13/0212* (2013.01)

(58) Field of Classification Search
CPC .................. B60R 13/0206; B60R 13/0212
See application file for complete search history.

(56) References Cited

U.S. PATENT DOCUMENTS

| | | | |
|---|---|---|---|
| 5,324,072 A | 6/1994 | Olson et al. | |
| 6,887,552 B2 | 5/2005 | Dykman et al. | |
| 7,134,685 B2 | 11/2006 | Panagos et al. | |
| 7,213,836 B2 | 5/2007 | Coon et al. | |
| 7,401,805 B2 | 7/2008 | Coon et al. | |
| 8,196,952 B2 | 6/2012 | Walston et al. | |
| 2001/0030268 A1 | 10/2001 | Larson | |
| 2003/0230044 A1* | 12/2003 | Peterson | B60R 13/0206 52/716.5 |
| 2005/0046154 A1 | 3/2005 | Rhea et al. | |
| 2014/0263895 A1* | 9/2014 | Dickenson | B60R 13/0206 248/206.5 |

FOREIGN PATENT DOCUMENTS

| | | | |
|---|---|---|---|
| CN | 103204130 A | 7/2013 | |
| DE | 202013102694 U1 * | 7/2013 | ......... B60R 13/0206 |
| WO | 2011/079178 A1 | 6/2011 | |

OTHER PUBLICATIONS

English machine translation of CN103204130.

* cited by examiner

*Primary Examiner* — Glenn Dayoan
*Assistant Examiner* — Melissa A Black
(74) *Attorney, Agent, or Firm* — Vichit Chea; King & Schickli, PLLC

(57) ABSTRACT

A headliner assembly for a motor vehicle includes a headliner and at least one dual shaft push pin for securing the headliner as well as at least one magnet fastener for securing the headliner to the body of the vehicle that cooperates with the dual shaft push pin.

12 Claims, 5 Drawing Sheets

HEADLINER ASSEMBLY FOR A MOTOR VEHICLE

TECHNICAL FIELD

This document relates generally to the field of motor vehicles and, more particularly, to a new and improved headliner assembly for a motor vehicle.

BACKGROUND

It is known in the art to install a headliner on the interior surface of a vehicle roof panel in order to provide acoustic dampening and an improved appearance to the passenger compartment of the vehicle. Typically the edges of the headliner are covered by various cosmetic trim pieces. Further many vehicles are equipped along each side with a side air canopy which is deployed in the event of a side impact from an area behind and adjacent to the top of the trim pieces such as along the B-pillar. In order to ensure proper deployment it is important that the headliner is retained in position on the roof panel during side air canopy deployment. This document relates to a new and improved headliner assembly that provides the necessary retention integrity to maintain the headliner in position during a side air canopy deployment.

SUMMARY

In accordance with the purposes and benefits described herein, a headliner assembly is provided for a motor vehicle. The headliner assembly comprises a headliner and at least one dual shaft push pin securing the headliner to a body of the vehicle. In addition the headliner assembly includes at least one magnet fastener that functions in conjunction with at least one of the dual shaft push pins to secure the headliner to the body of a vehicle and, more particularly, the vehicle roof panel in a safe, rattle free and effective manner.

Each dual shaft push pin includes a head, a first shaft and a second shaft. The first and second shafts are parallel and project in the same direction from the head. Further in one possible embodiment the first and second shafts include ribbing or ridges which help to ensure a high integrity connection of the headliner to the body of the vehicle. Further, in one possible embodiment the dual shaft push pin is made from nylon.

Each magnet fastener includes a base, a cup and a magnet. The cup is made from a ferromagnetic metal material to which the magnet is attracted so that the magnet is securely held in the cup.

In accordance with an additional aspect, a method is provided for securing a headliner to a body of a motor vehicle. That method comprises the steps of positioning the headliner relative to the body and securing the headliner to the body by inserting a dual shaft push pin through the headliner into the body. In one possible embodiment the body includes a roof support rail or channel and the method includes inserting the dual shaft push pin through the headliner into the roof rail adjacent a B-pillar of the vehicle. Further the method includes maintaining the headliner in the seated position along an interior surface of the roof panel of the motor vehicle by means of the dual shaft push pin even in the event of a side air canopy deployment from the B-pillar.

In the following description, there are shown and described several preferred embodiments of the headliner assembly. As it should be realized, the headliner assembly is capable of other, different embodiments and its several details are capable of modification in various, obvious aspects all without departing from the headliner assembly as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the headliner assembly and together with the description serve to explain certain principles thereof. In the drawings.

Reference will now be made in detail to the present preferred embodiments of the headliner assembly, an example of which is illustrated in the accompanying drawings.

DETAILED DESCRIPTION

Figure 1:
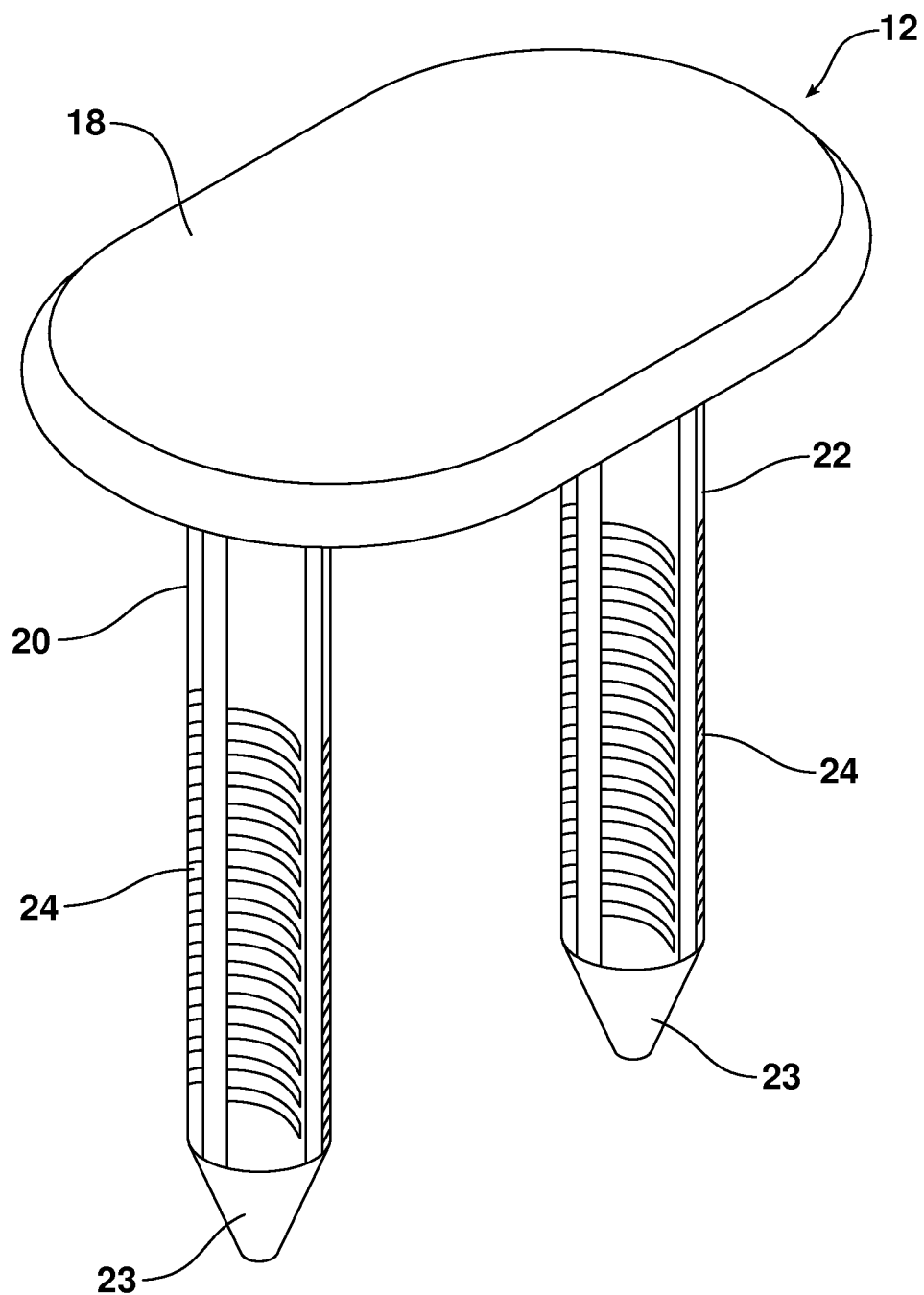
FIG. 1 is a perspective view of the dual shaft push pin of the headliner assembly.
Figure 2:
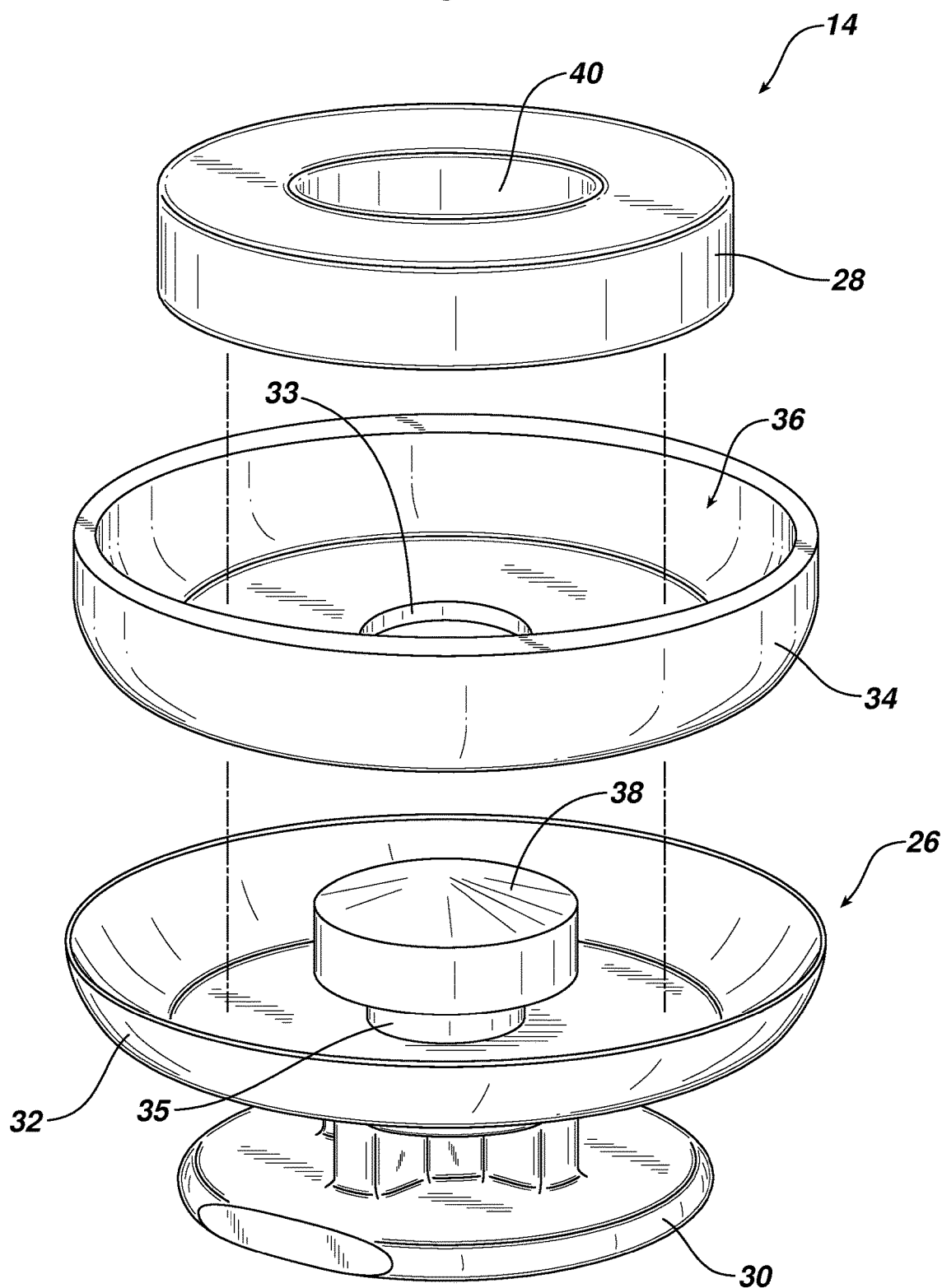
FIG. 2 is an exploded perspective view of the magnet fastener of the headliner assembly.
Figure 3:
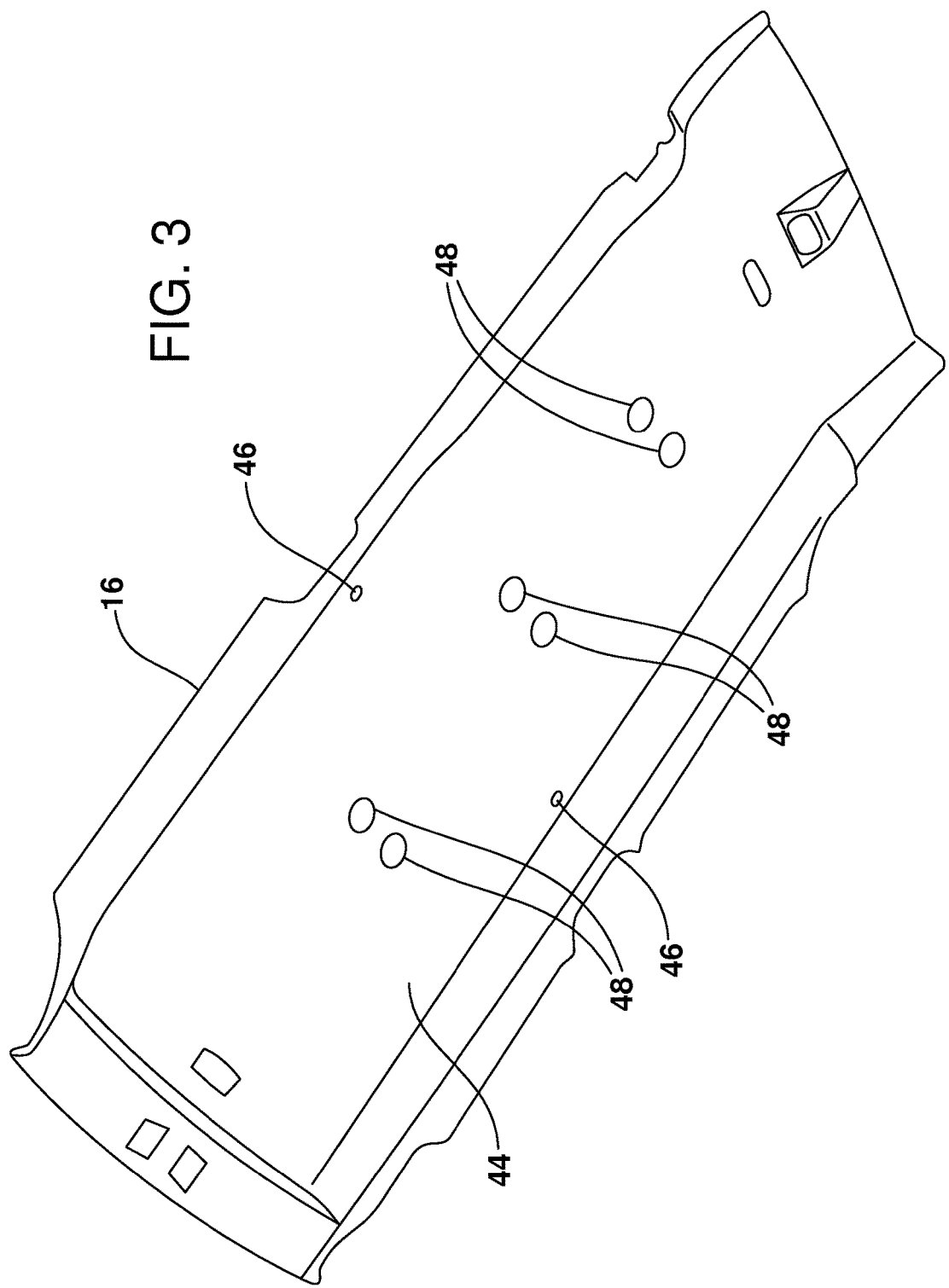
FIG. 3 is a perspective view of the headliner showing the interior surface thereof and indicating locations for the dual shaft push pins and magnet fasteners utilized to secure the headliner to the interior surface of the roof panel of the motor vehicle.
Figure 4:
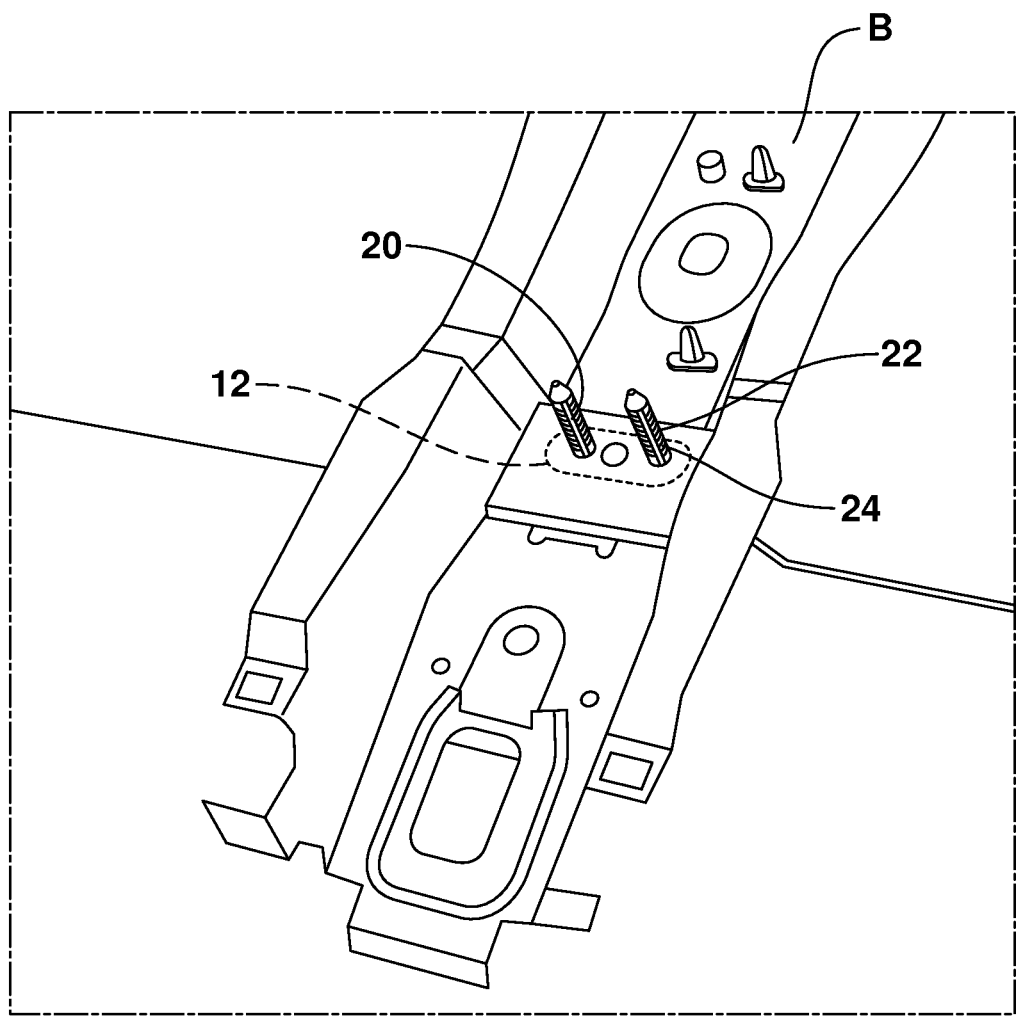
FIG. 4 is a detailed perspective view of a dual shaft push pin securing the headliner to a roof rail of a motor vehicle.
Figure 5:
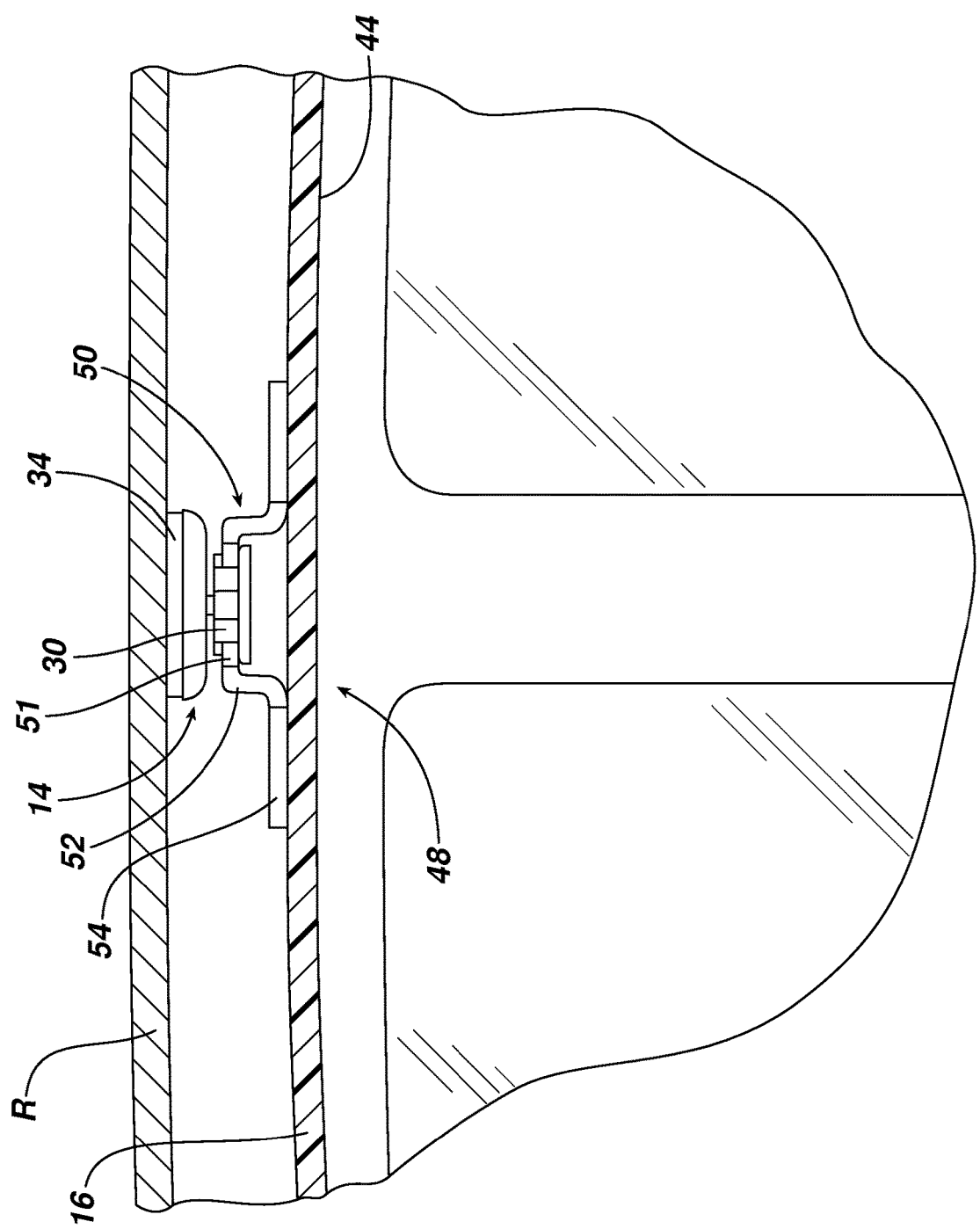
FIG. 5 is a schematical cross-sectional view showing a magnet fastener securing the headliner to the interior surface of the roof panel of a motor vehicle.

The headliner assembly incorporates at least one dual shaft push pin 12, as illustrated in FIG. 1, at least one magnetic fastener 14 as illustrated in FIG. 2, and a headliner 16 as illustrated in FIG. 3. As illustrated in FIGS. 4 and 5 and described in greater detail below, one or more dual shaft push pins 12 and one or more magnet fasteners 14 are utilized to secure the headliner to the interior surface S of the body/roof panel R of the vehicle V.

As best illustrated in FIG. 1, the dual shaft push pin 12 comprises a head 18, a first shaft 20 and a second shaft 22. As illustrated, in one embodiment the first and second shafts 20, 22 are parallel and project in the same direction from the head 18. In one possible embodiment each shaft includes a tapered end 23, which may or may not come to a point. In addition, each shaft 20, 22 includes ribbing 24 in the form of texture or ridges which help to secure the push pin 12 in position once it is inserted into a body member such as the roof support rail or rib B which supports the roof panel R in the manner illustrated in FIG. 4. The ribbing 24 may extend along part or all of the first shaft 20 and/or second shaft 22 depending upon the particular application or embodiment of the dual shaft pushpin 12.

In one possible embodiment, the dual shaft push pin 12 is made from nylon. It should be appreciated, however, that other appropriate materials may be utilized to make the dual shaft push pin 12 so that the pin may provide optimal performance for any particular application.

Reference is now made to FIG. 2 illustrating the magnet fastener 14. Each magnet fastener 14 includes a carrier 26 and a magnet 28. More specifically, the carrier 26 includes a unitary or single-piece body having a base 30 and a magnet support 32.

In addition, the magnet fastener 14 includes a cup 34 preferably made from a ferromagnetic material. The magnet support 32 comprises a bowl shaped cavity 36 having a contour that matches the outer wall of the cup 34 that is received and held in the cavity. In one particularly useful embodiment, the unitary carrier 26 is overmolded onto the cup 34 in accordance with the general principles of overmolding that are known in the art. Thus, the cup 34 includes a central aperture 33 and a stem 35 of the carrier 26 extends through to completely fill that aperture. Further the carrier 26 includes an integral fastener 38 on the stem 35 that captures the cup 34 on the stem and prevents any movement between the cup and the carrier.

As further illustrated in FIG. 2, the magnet 28 is annular in shape and includes an opening 40. When the magnet 28 is mounted in the cavity 36 of the cup 34 and held in the cup by the force of magnetic attraction, the opening 40 is received around the integral fastener 38 of the carrier 26.

Reference is now made to FIG. 3 illustrating the headliner 16 which includes an inner, ornamental surface 44 which provides an aesthetically pleasing appearance for the passenger compartment of the vehicle when the headliner is secured to the body or roof panel R. In the illustrated embodiment, the headliner assembly comprises the headliner 16, two dual shaft pushpins 12 which are utilized to secure the headliner to the roof rail B at the securing points 46 and six magnetic fasteners 14 that are utilized to secure the headliner to the inner surface S of the roof panel R at the securing points 48.

More specifically, reference is now made to FIG. 5 which illustrates a single magnet fastener 14 which is secured to a doghouse 50 by sliding a channel or groove in the base 30 into a slot 51 on the mounting boss 52 of the doghouse so as to provide a tight friction fit. The base 54 of the doghouse 50 is then secured with an appropriate adhesive to the headliner 16 at one of the securing points 48. After a magnet fastener 14 is secured in this fashion to each securing point 48, the headliner 16 is then positioned relative to the roof panel R.

More specifically, the magnet 28 held in the cup 34 of each magnet fastener 14 is used to make a blind connection to the roof panel R of the vehicle V.

Reference is now made to FIG. 4. When the headliner 16 is properly positioned on the roof panel R and held steady by the magnet fasteners 14, a dual shaft pushpin 12 is pushed through the headliner 16 and into the roof rail or rib B at each securing point 46 so that the two shafts 20, 22 are received and tightly held in the roof rail or rib which runs across and supports the roof panel R adjacent to the B-pillar of the vehicle. The ribbing or ridges 24 help to prevent the pin 12 from backing out and thereby ensure the integrity of the connection so that even in the event of a side air canopy deployment, the headliner 16 is held in proper position along the roof panel R where it will not interfere in any way with the deployment of the side air canopy.

The foregoing has been presented for purposes of illustration and description. It is not intended to be exhaustive or to limit the embodiments of the headliner assembly to the precise form disclosed. Obvious modifications and variations are possible in light of the above teachings. For example, while the illustrated headliner assembly includes two dual shaft push pins 12 and six magnetic fasteners, such an assembly may incorporate a different number of dual shaft push pins and/or magnet fasteners depending upon the particular application. All such modifications and variations are within the scope of the appended claims when interpreted in accordance with the breadth to which they are fairly, legally and equitably entitled.

What is claimed:

1. A headliner assembly for a motor vehicle, comprising:
    a headliner;
    at least one dual shaft push pin securing said headliner to a body of said vehicle, wherein said at least one dual shaft push pin includes a head, a first cylindrical shaft and a second cylindrical shaft and wherein said first shaft and said second shaft include ribbing; and
    at least one magnet fastener securing said headliner to said body of said vehicle, wherein said at least one magnet fastener includes a base, a cup and a magnet.

2. The headliner assembly of claim 1, wherein said first and second shafts are parallel and project in a same direction from said head.

3. The headliner assembly of claim 2, wherein said at least one dual shaft push pin is made from nylon.

4. The headliner assembly of claim 1, wherein said cup is made from a ferromagnetic metal material.

5. A method of securing a headliner to a body of a motor vehicle, wherein said body includes a roof rail, comprising:
    positioning said headliner relative to said body;
    securing said headliner to said body by inserting a ribbed dual cylindrical shaft push pin through said headliner into said roof rail adjacent a B-pillar of said vehicle; and
    maintaining said headliner in a seated position along an interior surface of a roof panel of a motor vehicle by means of said dual cylindrical shaft push pin in event of a side air canopy deployment from said B-pillar.

6. The method of claim 5, including further securing said headliner to the roof of the motor vehicle with a magnet fastener.

7. A headliner assembly for a motor vehicle, comprising:
    a headliner;
    at least one dual shaft push pin securing said headliner to a body of said vehicle, wherein said at least one dual shaft push pin includes a head, a first cylindrical shaft and a second cylindrical shaft and wherein said first shaft and said second shaft include textured ribbing; and
    at least one magnet fastener securing said headliner to said body of said vehicle, wherein said at least one magnet fastener includes a carrier and an annularly-shaped magnet.

8. The headliner assembly of claim 7, wherein the carrier includes a unitary base, a magnet support, a stem and an integral fastener on said stem.

9. The headliner assembly of claim 8, wherein the magnet fastener includes a cup having a central aperture such that the stem of the carrier extends through to completely fill said central aperture.

10. The headliner assembly of claim 9, wherein the magnet support comprises a bowl-shaped cavity having a contour matching an outer wall of the cup that is received and held in said cavity.

11. The headliner assembly of claim 10, wherein said integral fastener captures the cup on the stem to prevent any movement between the cup and the carrier.

12. The headliner assembly of claim 11, wherein said magnet includes an opening, such that when the magnet is mounted within the cavity of the cup said opening is received around the integral fastener of the carrier.

* * * * *